(12) United States Patent
Ma

(10) Patent No.: US 10,722,977 B2
(45) Date of Patent: Jul. 28, 2020

(54) LASER SCAN HEAD DESIGN FOR THREE SCANNING MIRRORS WITH OPTICS

(71) Applicant: Thorlabs, Inc., Newton, NJ (US)

(72) Inventor: Hongzhou Ma, Centreville, VA (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 16/401,643

(22) Filed: May 2, 2019

(65) Prior Publication Data

US 2019/0337092 A1    Nov. 7, 2019

Related U.S. Application Data

(60) Provisional application No. 62/666,473, filed on May 3, 2018.

(51) Int. Cl.
*B23K 26/08* (2014.01)
*B23K 26/06* (2014.01)
(Continued)

(52) U.S. Cl.
CPC ...... *B23K 26/0821* (2015.10); *B23K 26/0643* (2013.01); *B23K 26/0869* (2013.01); *G02B 26/105* (2013.01); *G02B 26/12* (2013.01)

(58) Field of Classification Search
CPC .............. B23K 26/0643; B23K 26/082; B23K 26/0821; B23K 26/0869; G02B 26/101; G02B 26/105; G02B 26/12; G02B 21/002; G02B 21/0032; G02B 21/004; G02B 21/0044; G02B 21/0048; G02B 21/0056; G02B 21/0068; G02B 21/0072;
(Continued)

(56) References Cited

U.S. PATENT DOCUMENTS

| | | | | |
|---|---|---|---|---|
| 7,439,477 B2 * | 10/2008 | Eda | ........................ | G02B 13/00 219/121.6 |
| 7,817,319 B2 * | 10/2010 | Pinard | .................. | B23K 26/082 359/202.1 |

(Continued)

FOREIGN PATENT DOCUMENTS

RU         2 492 514 C1     9/2013

OTHER PUBLICATIONS

International Search Report and Written Opinion of the International Searching Authority issued for corresponding International Patent Application No. PCT/US2019/030420, dated Aug. 15, 2019.

*Primary Examiner* — Hung D Nguyen
(74) *Attorney, Agent, or Firm* — Myers Wolin, LLC

(57) ABSTRACT

A scanning device including: a first, second and third scan mirrors; a first and second relay lenses; and a mirror; wherein the rotational axis of the second scan mirror is tilted with a first angle with respect to a reference plane, the optical axis of the first relay lens is tilted with the first angle with respect to the reference plane, the optical axis of the second relay lens is parallel to the reference plane and is orthogonal to that of the first relay lens, and the rotational axis of the first scan mirror is parallel to the reference plane; and the first and second scan mirrors, and first and second relay lenses are arranged such that the respective axes of the first and second scan mirrors, and first and second relay lenses lie on a plane that is tilted at the first angle with respect to the reference plane.

11 Claims, 8 Drawing Sheets

(51) Int. Cl.
  *B23K 26/082* (2014.01)
  *G02B 26/12* (2006.01)
  *G02B 26/10* (2006.01)

(58) Field of Classification Search
  CPC .................................................. G02B 21/0076;
    G02B 21/006; G02B 21/008; G02B
    21/0084; G02B 21/02; G02B 21/33;
    G02B 21/365; G02B 21/367
  USPC .............. 219/121.6, 121.73, 121.74, 121.75,
    219/121.78, 121.79, 121.8; 359/202, 213,
    359/214, 223, 224, 305, 315–324, 368,
    359/381, 384, 385, 388
  See application file for complete search history.

(56) References Cited

U.S. PATENT DOCUMENTS

| | | |
|---|---|---|
| 9,939,381 B1 | 4/2018 | Kimmel et al. |
| 10,254,524 B2 * | 4/2019 | Schwedt ............. G02B 21/002 |
| 2002/0163717 A1 * | 11/2002 | Lee .................... G02B 21/0032 |
| | | 359/388 |
| 2004/0032650 A1 * | 2/2004 | Lauer .................. G02B 21/004 |
| | | 359/385 |
| 2008/0316561 A1 * | 12/2008 | Okugawa ........... G02B 21/0048 |
| | | 359/201.1 |
| 2009/0073554 A1 * | 3/2009 | Nagasawa ............ G02B 21/002 |
| | | 359/385 |
| 2009/0147256 A1 * | 6/2009 | Okugawa ........... G02B 21/0064 |
| | | 356/318 |
| 2009/0174935 A1 * | 7/2009 | Szulczewski ........ G02B 21/002 |
| | | 359/368 |
| 2013/0301096 A1 * | 11/2013 | Takahashi ............ G02B 26/105 |
| | | 359/204.3 |
| 2015/0077844 A1 * | 3/2015 | Singer ................ G02B 21/0032 |
| | | 359/385 |
| 2016/0187646 A1 * | 6/2016 | Ehrmann ............ G02B 13/0095 |
| | | 219/121.73 |
| 2016/0349494 A1 * | 12/2016 | Dohi .................... G02B 5/3083 |
| 2017/0123196 A1 | 5/2017 | Svoboda et al. |
| 2017/0351074 A1 * | 12/2017 | Tamano ............. G02B 21/0088 |

* cited by examiner
LASER SCAN HEAD DESIGN FOR THREE SCANNING MIRRORS WITH OPTICS

CROSS REFERENCE TO RELATED APPLICATIONS

This application claims the benefit of U.S. Provisional Application No. 62/666,473 filed on May 3, 2018. The disclosures of U.S. Provisional Application No. 62/666,473 are hereby incorporated by reference.

FIELD OF THE INVENTION

This invention relates generally to laser scan head designs, and more particularly to configurations of the position and orientation of the scanning elements to optimize size, scan angle, scan orientation and optical performance of the laser scan head.

BACKGROUND

Confocal or two-photon laser scanning microscopes usually adopt one of two scanning modes. One utilizes two Galvanometer scanning mirrors (hereafter refers as GG mode) to steer laser beam in orthogonal axes in a raster pattern to cover a rectangular area. The other utilizes one Resonant scanning mirror to steer laser beam in one axis and a Galvanometer scanning mirror in the orthogonal axis (hereafter refers as RG mode). In the GG mode, user defines the laser beam scanning trajectory which is restricted by certain angular acceleration. In the RG mode, the resonant scanning mirror scans several folds faster than Galvanometers while runs in sinusoid at a fixed frequency. In other words, the RG mode scans much faster than the GG mode yet lacks the flexibility of defining the scanning trajectory. It is therefore advantageous to combine the two modes in one (hereafter refers as RGG mode) thus user is capable of running fast scans at defined position or along defined path. In practice, how to fit all components in a compact enclosure without sacrificing performance is not trivial. An ideal optomechanical design needs to consider the clear aperture, the mirror shape, the air space between mirrors, a relatively large scanning angle, an optical system for scanning conjugation, nice noise isolation, and a user-friendly interface.

Therefore, there is long-felt need for a design of RGG scan head that overcomes the technical hurdles discussed above.

SUMMARY

In one embodiment, the present invention provides a scanning device including: a first scan mirror; a second scan mirror; a third scan mirror; a first relay lens; a second relay lens; and a mirror; wherein the rotational axis of the second scan mirror is tilted with a first angle with respect to a reference plane, the optical axis of the first relay lens is tilted with the first angle with respect to the reference plane, the optical axis of the second relay lens is parallel to the reference plane and is orthogonal to that of the first relay lens, and the rotational axis of the first scan mirror is parallel to the reference plane; and the first and second scan mirrors, first and second relay lenses are arranged such that the respective axes of the first and second scan mirrors, and first and second relay lenses lie on a plane that is tilted at the first angle with respect to the reference plane; wherein the first scan mirror is configured to scan an input light beam to the first relay lens, the first relay lens is configured to relay the light beam to a mirror; the mirror, being tilted by the first angle with respect to a normal to the reference plane, is configured to reflect the light beam to the second relay lens; and the second relay lens is configured to relay the light beam to the second scan mirror; and the second and third scan mirrors are configured to scan the light beam in orthogonal directions; and the scanning of the first scan mirror and the scanning of the second scan mirror both result in an output light beam scanned in the same direction.

DETAILED DESCRIPTION OF THE PREFERRED EMBODIMENTS

Figure 1:
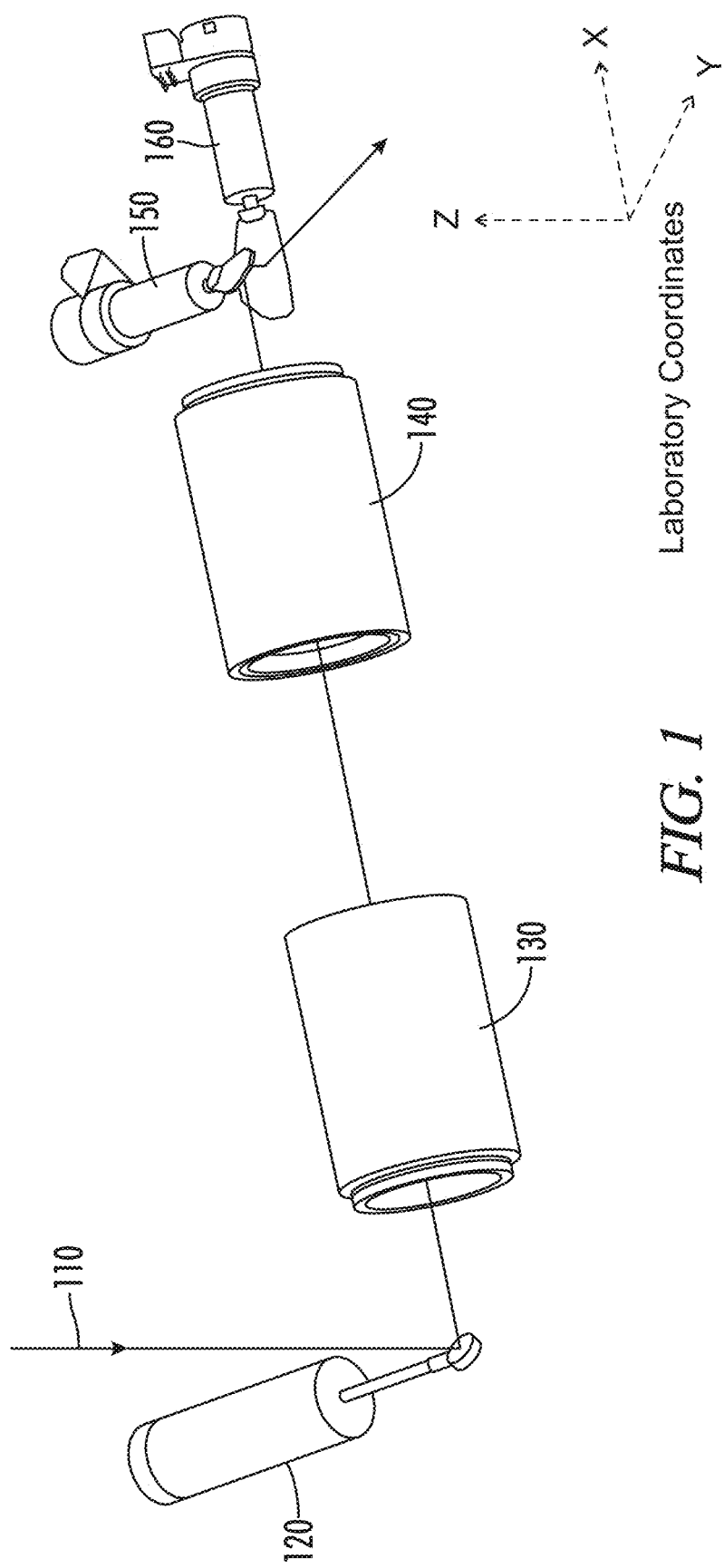
FIG. 1 illustrates the structure of an RGG scanner.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Air Space, Scanning Angle and Tilt of Scanners

FIG. 1 functionally illustrates the structure of the RGG scanner. The laser bean 110, usually collimated, hits the resonant scanner 120 first, passes through a 4f relay system including a first relay lens 130 and a second relay lens 140. Then the laser beam reaches an X galvanometer scanner 150 and a Y galvanometer scanner 160. Both the resonant scanner and X galvanometer scanner deflect the beam in the X direction. Hence, their rotational axles have to be aligned parallel to each other. This is crucial for user to scan a squared region properly. The Y galvanometer scanner 160 deflects the beam in the Y direction.

Figure 2:
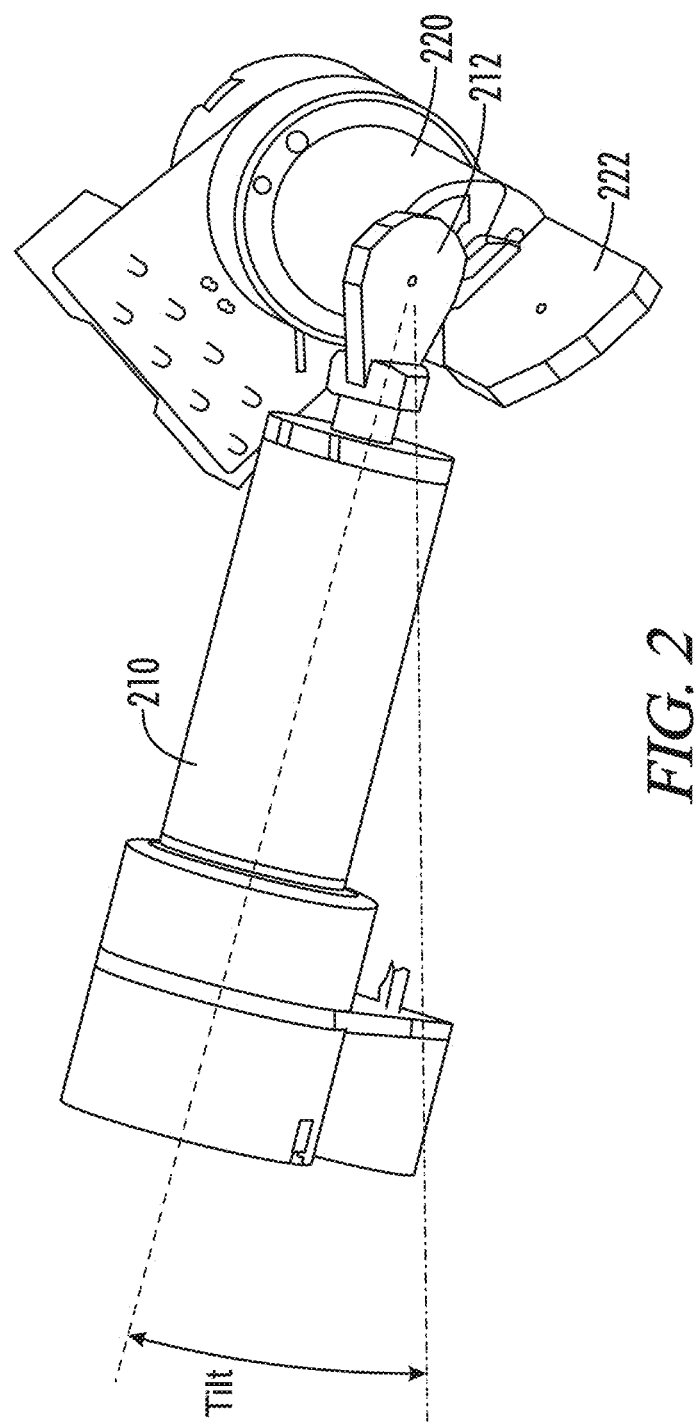
FIG. 2 illustrates a common practice is to tilt the X galvanometer axis by certain angle.

In a GG air spaced scan head, the X scanning mirror 212 of the X galvanometer scanner 210 and Y scanning mirror 222 of the Y galvanometer scanner 220 are placed as close to each other as possible without collision during scanning. To make the air space smaller, a common practice is to tilt the X galvanometer axis by certain angle, e.g. 20 degrees, as illustrated in FIG. 2. As mentioned above, the resonant scanner needs to tilt by same amount of angle to be parallel to X galvanometer. As a result, the laser beam entering into the RGG scanner needs to follow the tilt. Though titling incident angles does not alter the system functionally, it does introduce hurdles for beam alignment.

Figure 3:
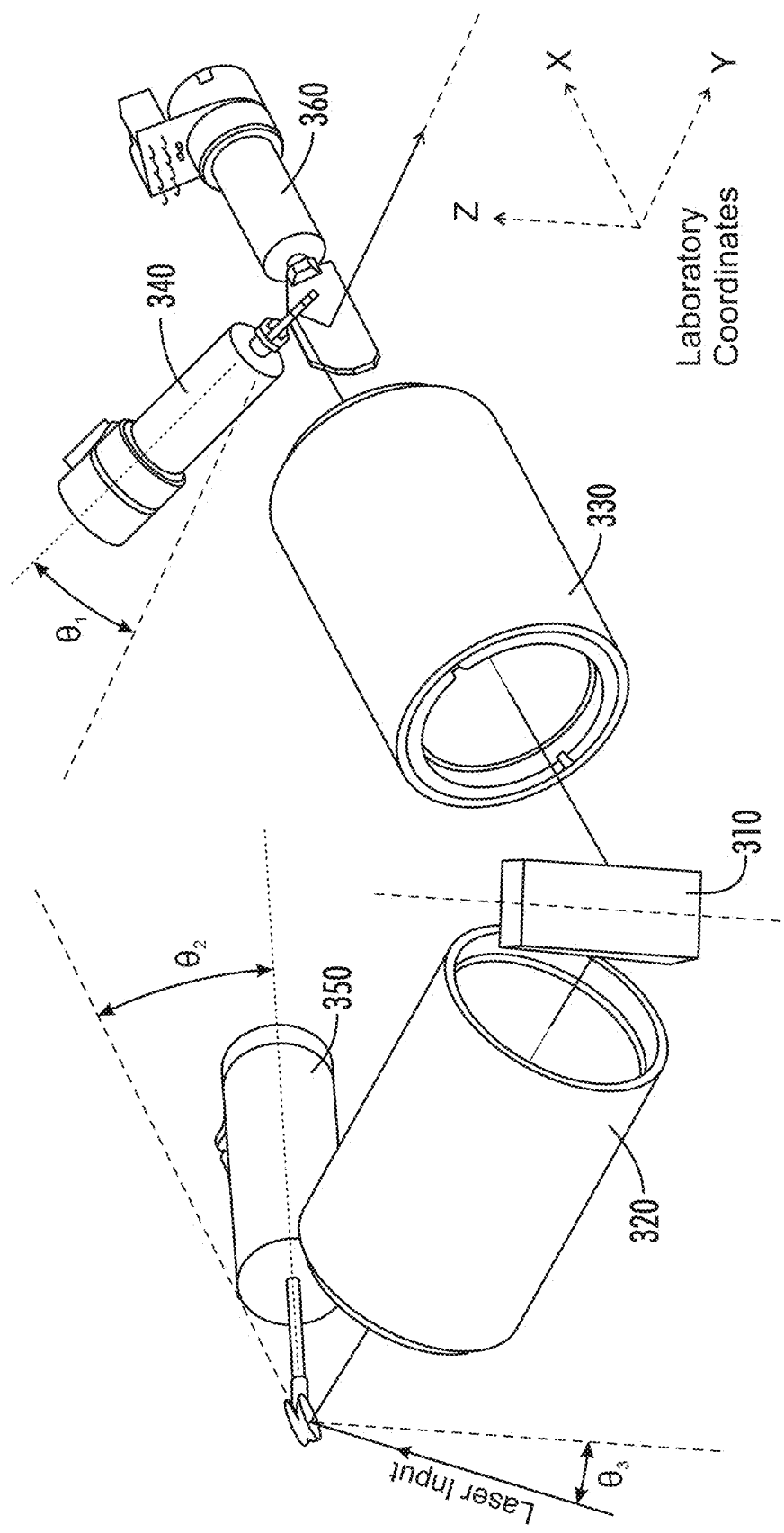
FIG. 3 illustrates a conventional configuration of an RGG scanner.

FIG. 3 illustrates a conventional RGG configuration. A folding mirror 310 is introduced between the first relay lens 320 and second relay lens 330 such that the overall dimension of RGG scan head can be reduced. For ease of discussion, the folding mirror 310 aligns to the laboratory Z coordinate as a non-limiting illustration example. To match the tilt (by angle θ1) of the X galvanometer 340, the resonant scanner 350 has to tilt by the same among of angle $\theta_2=\theta_1$. Thus, the input laser has to be configured to hit the resonant scanning mirror at an angle $\theta_3=\theta_2$ from the coordinate Z axis. The Y galvanometer scanner 360 deflects the beam in the Y direction. Such configuration adds uncertainty for laser alignment; thus, it is not a user-friendly design.

Figure 4:
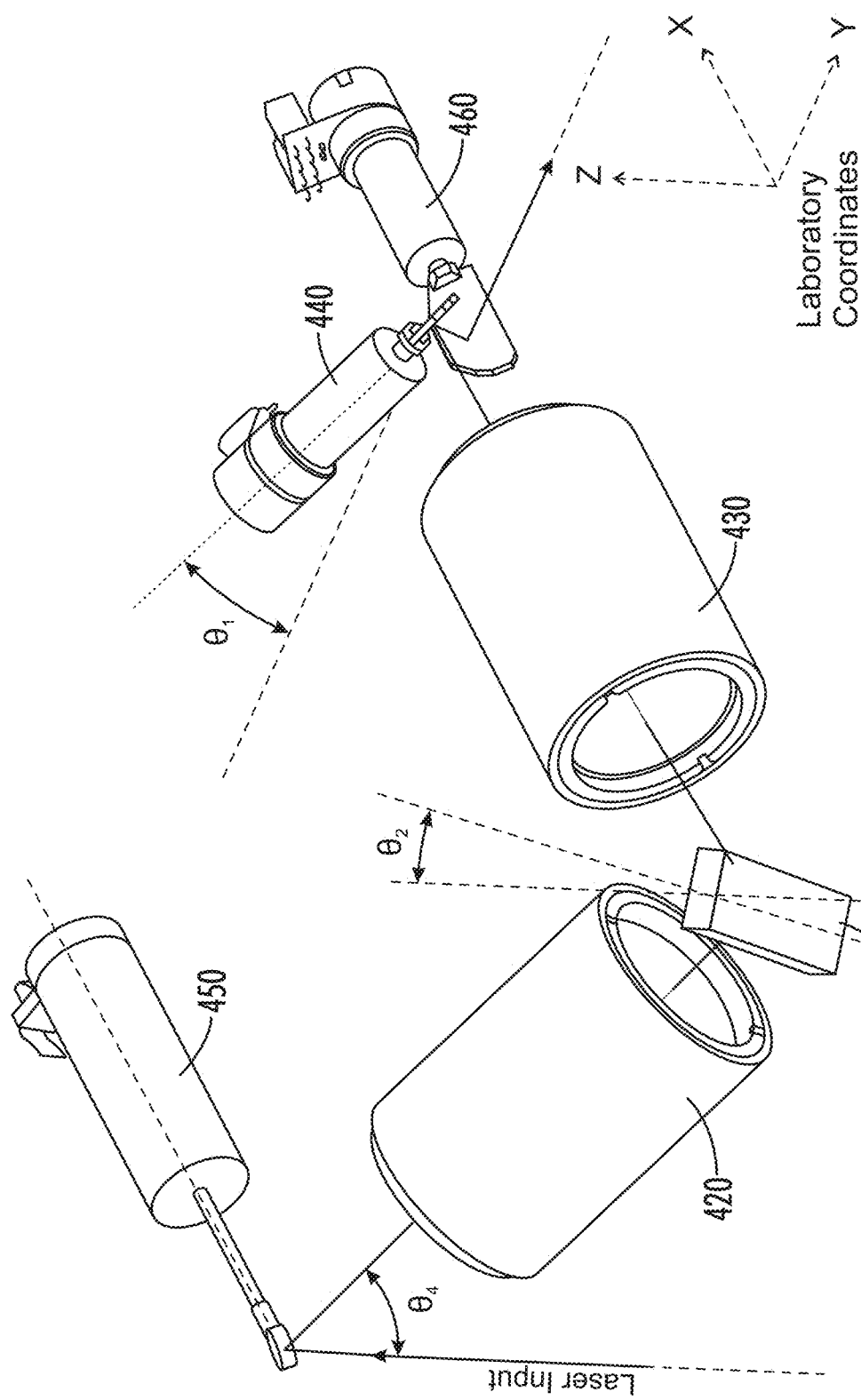
FIG. 4 illustrates a configuration of an RGG scanner according to an embodiment.
Figure 5:
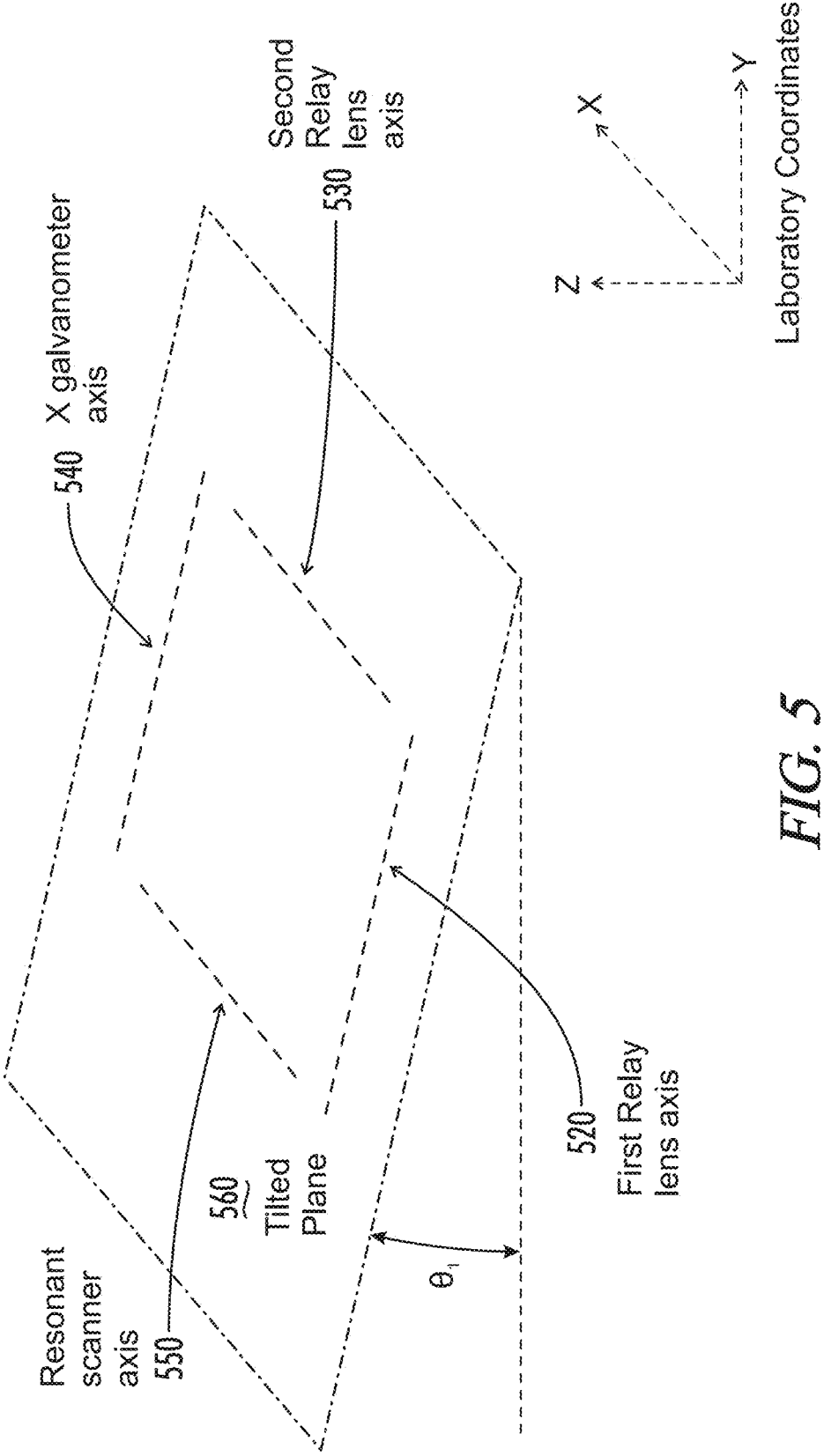
FIG. 5 illustrates a titled plane containing the axes of a resonant scanner, X galvanometer, first relay lens and second relay lens according to an embodiment.
Figure 6:
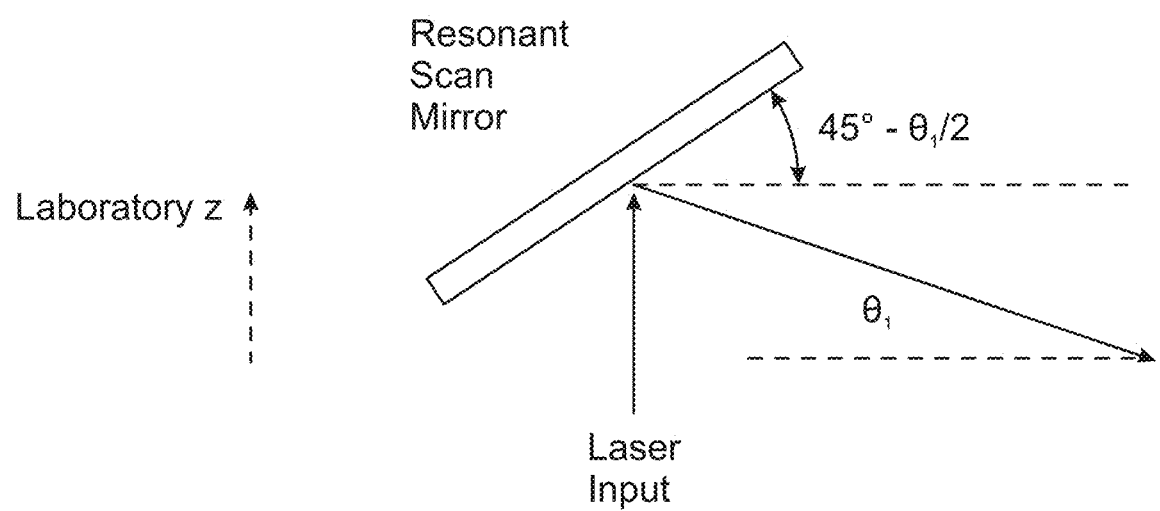
FIG. 6 illustrates the angle of the resonant scan mirror in relation to the angle of the tilted plane according to an embodiment.

FIG. 4 illustrates a design to get rid of the input beam tilting according to an embodiment of the present invention. A folding mirror 410 is introduced between the first relay lens 420 and second relay lens 430 such that the overall dimension of RGG scan head can be reduced. In addition, the folding mirror axis tilts by an angle $\theta_2=\theta_1$ from the laboratory Z coordinate as a non-limiting illustration example. The relay lens 420 also tilts by the same amount so that its axis aligns parallel to the axis of the X galvanometer 440. The resonant scanner 450 does not need to tilt. The Y galvanometer scanner 460 deflects the beam in the Y direction. In such a configuration, the cylindrical axes of the four components: X galvanometer 540, first relay lens 520, second relay lens 530 and resonant scanner 550 lie in the same plane 560, as shown in FIG. 5. Yet the plane 560 tilts by $\theta_1$ from the laboratory XY plane. In conventional setup, the neutral scan angle position of the resonant scanner is 45° from the horizontal. To compensate for the tilt, the neutral scan angle position of the resonant scanner can simply be turned by angle $\theta_1/2$ from its conventional 45°, as shown in FIG. 6. In this way, the laser input beam just needs to be aligned to the laboratory Z axis. All the components of the scan head will be factory pre-aligned and assembled in an enclosure. For example, the input port can be machined parallel to laboratory YZ plane and the output port parallel to XZ plane. The squared input/output ports provide a user-friendly interface.

As an illustrative practical example, it is assumed that in order to make the air space smaller, the X galvanometer axis is tilted by an angle of 20°. The folding mirror, together with the first relay lens and resonant scanner tilt up so the optics axis of the first relay lens is parallel to the X Galvanometer axis. To compensate for the input laser beam coming vertically up from below, the resonant scanner folds at 35° angle (=45°−20°/2) instead of the conventional 45° neutral scan angle position. In the configuration in FIG. 4, we have vertical laser beam entering the RGG scanner, reflected by the resonant scan mirror by an angle $\theta_4$, and horizontal laser beam coming out of the scanner from the Y galvanometer port. Maintaining such vertical and horizontal direction with respect to the laboratory coordinates makes it very convenient and user friendly.

Noise Isolation

Resonant scanner runs at around 4-12 kilo Hertz. It generates a high pitch disturbing noise. If not acoustically isolated, it may hinder some auditory cortex experiments from obtaining proper results. A design according to an embodiment includes a method to minimize the noise decibel emitted from the scanner block.

Figure 7:
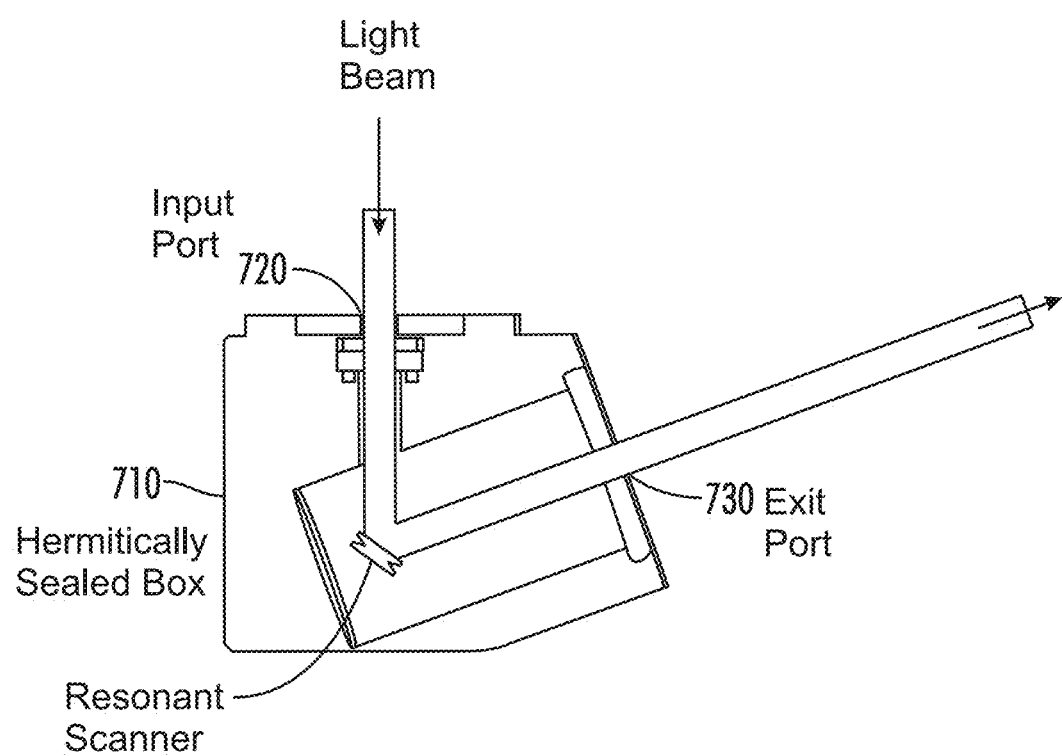
FIG. 7 illustrates a resonant scanner in a hermitically sealed block according to an embodiment.
Figure 8:
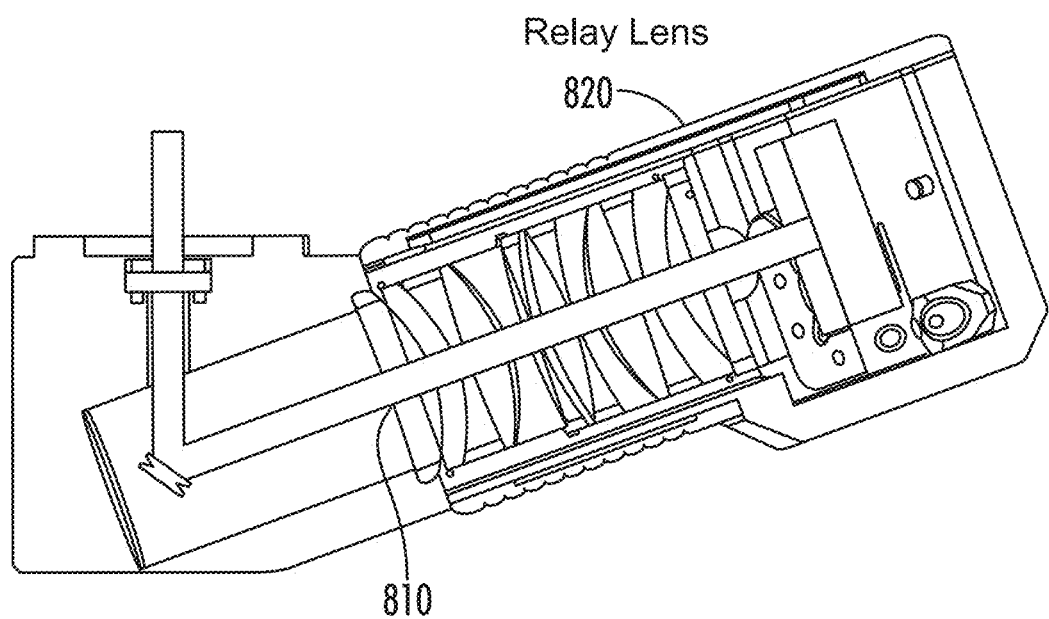
FIG. 8 illustrates a resonant scanner in a hermitically sealed block coupled with a relay lens according to an embodiment.

To isolate the noise, according to an embodiment, the resonant scanner is separately held in a hermitically sealed metal block 710 as shown in FIG. 7. The input port 720 of the block is sealed with an optical window that allows laser beam to pass through. In one embodiment, the exit port 810 of the block is sealed with the first relay lens 820, as shown in FIG. 8. After positioning the resonant scanner to the proper angle, any gap between scanner shaft and metal block is injected with sealant to prevent acoustic noise from penetrating out.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A scanning device comprising:
   a first scan mirror;
   a second scan mirror;
   a third scan mirror;
   a first relay lens;
   a second relay lens; and
   a mirror;
   wherein a rotational axis of the second scan mirror is tilted with a first angle with respect to a reference plane, an optical axis of the first relay lens is tilted with the first angle with respect to the reference plane, an optical axis of the second relay lens is parallel to the reference plane and is orthogonal to that of the first relay lens, and an rotational axis of the first scan mirror is parallel to the reference plane; and the first and second scan mirrors, first and second relay lenses are arranged such that the respective axes of the first and second scan mirrors, and first and second relay lenses lie on a plane that is tilted at the first angle with respect to the reference plane;

wherein the first scan mirror is configured to scan an input light beam to the first relay lens, the first relay lens is configured to relay the light beam to the mirror; the mirror, being tilted by the first angle with respect to a normal to the reference plane, is configured to reflect the light beam to the second relay lens; and the second relay lens is configured to relay the light beam to the second scan mirror; and the second and third scan mirrors are configured to scan the light beam in orthogonal directions; and the scanning of the first scan mirror and the scanning of the second scan mirror both result in an output light beam scanned in the same direction.

2. The scanning device of claim 1, wherein the first scan mirror is a resonant scan mirror and the second and third scan mirrors are galvanometer scan mirrors.

3. The scanning device of claim 1, wherein the reference plane is the horizontal plane and the device is configured to receive the input light beam in the vertical direction.

4. The scanning device of claim 1, wherein a neutral scan angle position of the first scan mirror is offset by half of the first angle.

5. The scanning device of claim 1, wherein the first angle is selected to minimize the air space between the second and third scan mirrors, based on the respective sizes and scanning angle ranges of the second and third mirrors.

6. The scanning device of claim 5, wherein the first angle is about 20°.

7. The scanning device of claim 1, wherein the first scan mirror is acoustically isolated.

8. The scanning device of claim 7, wherein the first scan mirror is in a hermitically sealed enclosure.

9. The scanning device of claim 8, wherein the first scan mirror scans at a frequency of about 4-12 kHz.

10. The scanning device of claim 8, wherein the enclosure comprises an input port sealed with an optical window and an output port sealed with the first relay lens.

11. The scanning device of claim 1, wherein the first and second relay lenses form a 4f relay system.

* * * * *